Patented Aug. 23, 1932

1,873,938

UNITED STATES PATENT OFFICE

GUSTAV REDDELIEN, OF LEIPZIG, AND HEINRICH OHLENDORF, OF DESSAU IN ANHALT, GERMANY, ASSIGNORS TO GENERAL ANILINE WORKS, INC., OF NEW YORK, N. Y., A CORPORATION OF DELAWARE

NAPHTHOPHENAZINE DYE

No Drawing. Application filed February 15, 1929, Serial No. 340,324, and in Germany February 7, 1928.

The present invention relates to the manufacture of azine-dyes which dye wool fast yellow to orange tints.

The new dyes are sulfonic acid derivatives of of $\alpha.\beta$-naphthophenazine

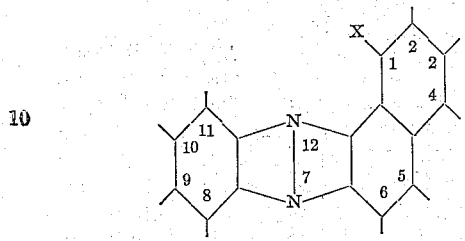

substituted in the 1-position by a group X comprising OH, $NH_2$ and NH-acyl. The new dyes in the form of dry sodium salts are yellow to orange powders, soluble with a yellow to orange color in water.

The dyes may be manufactured by condensing a 1.2-naphthoquinone-sulfonic acid substituted in the 8-position by a group comprising OH, $NH_2$ and NH-acyl with an 1.2-diamino-compound of the benzene series such as 1.2-diaminobenzene, 1-methyl-3.4-diaminobenzene, 1-chloro-3.4-diaminobenzene, 1.2-diaminobenzene-4-sulfonic acid. In a known manner the free amino-group may be acylated and from an acyl-amino-group the acid radicle may be split off. When starting from the condensation product of a 1.2-napthoquinone-disulfonic acid containing in the 8-position a sulfonic acid group with a 1.2-diamino-compound of the benzene series the sulfonic acid group in the 1-position of the napthophenazine nucleus is replaced by the hydroxyl-group in the alkali melt, the other sulfonic acid group being retained.

The following examples, the parts being by weight, illustrate the invention without limiting it:

*Example 1.*—10 parts of $\alpha.\beta$-naphthophenazine-1.6-disulfonic acid, which may be made from 1.2-naphthoquinone-3.8-disulfonic acid and 1.2-diaminobenzene, are stirred with 15 parts of a solution of potassium hydroxide of 48 per cent. strength, whereupon 40 parts of potassium hydroxide are added and the whole is kept at 170° C. for about an hour. During this operation hydroxyl enters the 1-position, while the sulfonic acid group in the 6-position is retained. The melt is diluted with 120 parts of water. On cooling, the potassium salt of 1-hydroxy-$\alpha.\beta$-naphthophenazine-6-sulfonic acid

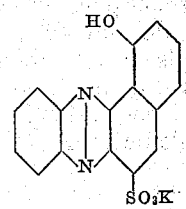

separates, while the mother liquor contains a portion of the azinedisulfonic acid which has not taken part in the reaction. The compound dissolves in concentrated sulfuric acid to a blue solution and in water to a yellow solution. It is a wool dyestuff of good levelling power and fastness to light. It yields a clear yellow tint.

*Example 2.*—33 parts of potassium salt of 8-actyl-amino-1.2-naphthoquinone-5-sulfonic acid (obtainable, for example, by reducing in known manner the nitroso-compound of 8-acetylamino-1-hydroxynaphthalene-5-sulfonic acid to produce 8-acetylamino-2-amino-1-hydroxynaphthalene-5-sulfonic acid and oxidizing the latter) are condensed in the usual manner with 11 parts of 1.2-diaminobenzene. The potassium 1-acetylamino-$\alpha.\beta$-naphthophenazine-4-sulfonate

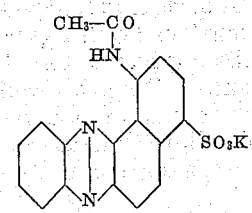

thus obtained crystallizes in yellow, brassy needles, soluble in water to a greenish-yellow solution and in concentrated sulfuric acid to a green-yellow solution. It dyes wool a clear greenish-yellow tint of excellent levelling power and unusually high fastness to light.

*Example 3.*—38 parts of the sodium salt of the acetyl-compound, made as described in Example 2, are dissolved in 800 parts of water and, after addition of 100 parts of concentrated sulfuric acid, the solution is boiled for 6 hours, whereby the 1-amino-α.β-naphthophenazine-4-sulfonic acid

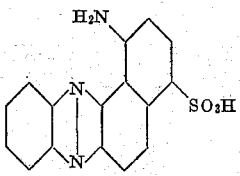

is precipiated in the form of blue needles, it being very sparingly soluble in its free state. It yields an orange alkali salt soluble in water. It dyes wool a red-orange tint of good levelling power.

*Example 4.*—35 parts of the sodium salt of 1-amino-α.β-naphthophenazine-4-sulfonate are dissolved in 500 parts of water, 16 parts of benzoylchloride and 12 parts of sodium carbonate crystals are added and the whole is stirred for several hours at 60–70° C. From the mixture 1-benzoylamino-α.β-naphthophenazine-4-sulfonic acid

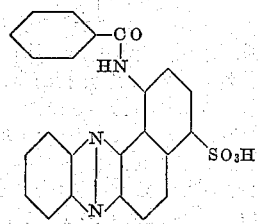

crystallizes in yellow needles. It dyes wool a reddish-yellow tint of good fastness to washing and fulling and excellent fastness to light.

The compound obtained in corresponding manner from 2-chlorobenzoyl-chloride yields an orange dyeing which has good fastness to washing and fulling and marked levelling power.

The dyestuff from 4-nitrobenzoyl-chloride, made in similar manner, yields, like the acetyl-compound, clear greenish-yellow tints. Besides the marked levelling power of the dyestuff the dyeing has an excellent fastness to washing and fulling, as well as an unusually high degree of fastness to light. Similar clear yellow tints are obtained with the dyestuff made from 3-nitrobenzoyl-chloride.

*Example 5.*—65 parts of the potassium salt of 8-acetylamino-1.2-naphthoquinione-5-sulfonic acid (Example 2) are condensed, at 70–80° C., in 1000 parts of water with 40 parts of 1.2-diaminobenzene-4-sulfonic acid with addition of 42 parts of crystallized sodium acetate. When the reaction is complete the azine-compound is precipitated by addition of common salt. This precipitate is a mixture of 1-acetylamino-α.β-naphthophenazine-4.9-dissulfonic acid

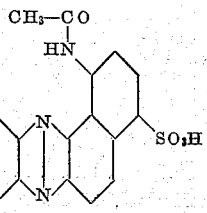

and the corresponding 4.10-disulfonic acid

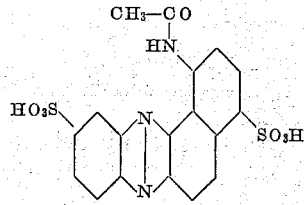

In dry condition it is a yellow powder, which dissolves in water to a yellow solution. It dyes wool a pure yellow of good fastness to washing and fulling, as well as of excellent fastness to light.

Saponification of this product in the manner prescribed in Example 3 yields a 1-amino-α.β-naphthophenazine-disulfonic acid which may be acylated again by means of a suitable acid chloride to produce a 1-aroylamino-azine-disulfonic acid. For example, with 4-nitrobenzoyl-chloride there is obtained a dyestuff which dyes animal fiber very clear yellow tints which have properties of fastness even better than those of the acetyl-compound.

*Example 6.*—In the manner described in Example 2, 8-acetylamino-1.2-naphthoquinone-4-sulfonic acid (obtainable from 8-acetylamino-1-hydroxynaphthalene-4-sulfonic acid) is condensed with 1.2-diaminobenzene. The 1-acetylamino-α.β-naphthophenazine-5-sulfonic acid thus obtained

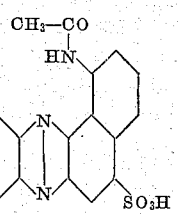

dyes wool tints of similar color and fastness to those described in Example 2 for the corresponding 4-sulfonic acid.

By saponification there may be obtained a 1-amino-α.β-naphthophenazine-5-sulfonic acid which by treatment with an acid chloride, such as benzoylchloride, or a chlorinated or nitrated benzoylchloride, gives further dyestuffs which are similar to those obtained as described in Examples 4 and 5.

We claim:

1. As a new product, the azine dye of the general formula

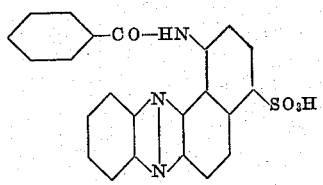

being in the form of the sodium salt being a yellow compound crystallized in yellow needles, soluble in water with a yellow color and dyeing wool fast yellow tints.

2. As new products, the azine dyes corresponding in the form of the free acids to the probable, general formula

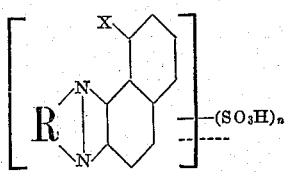

wherein R represent a phenylene nucleus, an alkyl-phenylene or a halogenated phenylene nucleus, X represents OH, NH$_2$, NH-acetyl, NH-benzoyl, NH-halogenobenzoyl or NH-nitrobenzoyl and $n$ is 1 or 2, these dyes being in the form of the sodium salts yellow to orange powders soluble in water with a yellow to orange color and dyeing wool fast yellow to orange tints.

3. As new products, the azine dyes corresponding in the form of the free acids to the probable, general formula

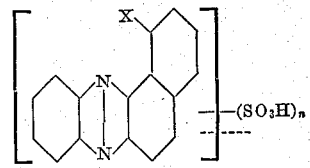

wherein X represents OH, NH$_2$, NH-acetyl, NH-benzoyl, NH-halogenobenzoyl or NH-nitrobenzoyl and $n$ is 1 or 2, these dyes being in the form of the sodium salts yellow to orange powders soluble in water with a yellow to orange color and dyeing wool fast yellow to orange tints.

4. As new products, the azine dyes corresponding in the form of the free acids to the probable, general formula

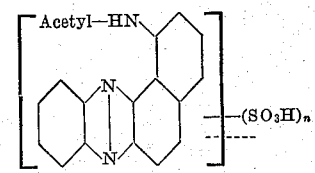

wherein $n$ is 1 or 2, these dyes being in the form of the sodium salts yellow to orange powders soluble in water with a yellow to orange color and dyeing wool fast yellow to orange tints.

5. As new products, the azine dyes corresponding in the form of the free acids to the probable, general formula

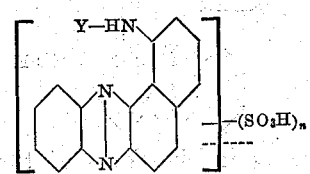

wherein Y represents a benzoyl, a nitrobenzoyl or a halogeno benzoyl group and $n$ is 1 or 2, these dyes being in the form of the sodium salts yellow to orange powders soluble in water with a yellow to orange color and dyeing wool fast yellow to orange tints.

6. As new products, the azine dyes corresponding in the form of the free acids to the general formula

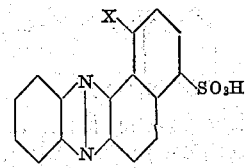

wherein X represents an amino group, an acetylamino, a benzoylamino, a nitrobenzoylamino or a halogenobenzoyl amino group, these dyes being in the form of the sodium salts yellow to orange powders soluble in water with a yellow to orange color and dyeing wool fast yellow to orange tints.

7. As new products, the azine dyes corresponding in the form of the free acids to the general formula

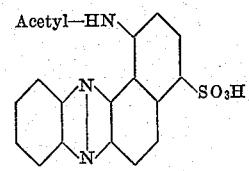

these dyes being in the form of the sodium salts yellow to orange powders soluble in water with a yellow to orange color and dyeing wool fast yellow to orange tints.

8. As new products, the azine dyes corresponding in the form of the free acids to the general formula

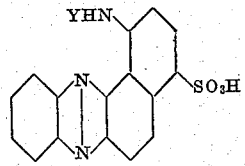

wherein Y is a benzoyl, a nitrobenzoyl or a halogeno benzoyl group, these dyes being in the form of the sodium salts yellow to orange powders soluble in water with a yellow to orange color and dyeing wool fast yellow to orange tints.

9. As a new product, the azine dye corresponding in the form of the free acid to the formula

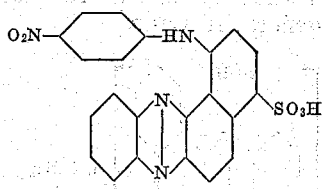

this dye being in the form of the sodium salt a yellow powder soluble in water with a yellow color and dyeing wool clear greenish-yellow tints.

10. As a new product, the azine dye corresponding in the form of the free acid to the formula

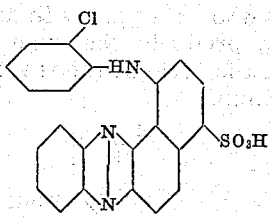

this dye being in the form of the sodium salt an orange powder soluble in water with an orange color and dyeing wool clear orange tints.

In testimony whereof we affix our signatures.

GUSTAV REDDELIEN.
HEINRICH OHLENDORF.